United States Patent
Ghumare et al.

(10) Patent No.: US 9,670,397 B2
(45) Date of Patent: Jun. 6, 2017

(54) AMIDO-FUNCTIONALIZED GEMINI SURFACTANT FOR FLUID CONTROL IN SUBTERRANEAN FORMATIONS

(71) Applicant: HALLIBURTON ENERGY SERVICES, INC., Houston, TX (US)

(72) Inventors: Anant Kanhoba Ghumare, Maharashtra (IN); Ramesh Uppuluri, Maharashtra (IN); Ravikant Belakshe, Maharashtra (IN)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 116 days.

(21) Appl. No.: 14/414,036

(22) PCT Filed: Feb. 21, 2014

(86) PCT No.: PCT/US2014/017837
§ 371 (c)(1),
(2) Date: Jan. 9, 2015

(87) PCT Pub. No.: WO2015/126418
PCT Pub. Date: Aug. 27, 2015

(65) Prior Publication Data
US 2016/0272875 A1 Sep. 22, 2016

(51) Int. Cl.
*C09K 8/60* (2006.01)
*C09K 8/035* (2006.01)
*C09K 8/68* (2006.01)
*C09K 8/86* (2006.01)

(52) U.S. Cl.
CPC .............. *C09K 8/602* (2013.01); *C09K 8/035* (2013.01); *C09K 8/68* (2013.01); *C09K 8/86* (2013.01)

(58) Field of Classification Search
CPC . C09K 8/602; C09K 8/62; C09K 8/68; C09K 8/86
USPC .......................................................... 507/240
See application file for complete search history.

(56) References Cited

U.S. PATENT DOCUMENTS

| | | | |
|---|---|---|---|
| 4,460,627 A | 7/1984 | Weaver et al. |
| 5,979,557 A | 11/1999 | Card et al. |
| 8,222,455 B2 | 7/2012 | Knox |
| 8,273,692 B2 | 9/2012 | Eoff |
| 8,420,576 B2 | 4/2013 | Eoff |
| 2007/0012445 A1 | 1/2007 | Nguyen et al. |
| 2011/0071056 A1 | 3/2011 | Saini et al. |

FOREIGN PATENT DOCUMENTS

| | | |
|---|---|---|
| GB | 2332224 | 6/1999 |
| WO | 2005040554 | 5/2005 |

OTHER PUBLICATIONS

Sparlin, Derry; "Polyacrylamides Can Restrict Water, Oil and Gas Production—It's Your Choice"; SPE 6473; pp. 95-97; Feb. 21-22, 1977.

(Continued)

*Primary Examiner* — Frances Tischler
(74) *Attorney, Agent, or Firm* — Polsinelli PC

(57) ABSTRACT

Controlling fluid flow in a subterranean formation containing water and hydrocarbons utilizing a Gemini surfactant introduced to the formation via a wellbore. The Gemini surfactant includes a head group having two cationic groups linked by an alkyl spacer, an amide extending from each of the cationic groups, and each amide having a hydrophobic tail extending therefrom.

19 Claims, 2 Drawing Sheets

(56) References Cited

OTHER PUBLICATIONS

Eoff, Larry; "Structure and Process Optimization for the Use of a Polymeric Relative-Permeability Modifier in Conformance Control"; SPE 64985; Feb. 13-16, 2001.
Ghumare, Anant; "Synthesis and Antibacterial Activity of Novel Amido-Amine-Based Cationic Gemini Surfactants"; J Surfact Deterg; Published Online: Oct. 25, 2012.
Dalrymple, Dwyann; "Relative Permeability Modifiers in Fracture Stimulation Applications"; Copyright 2009, SPE 119850; 11 Pages.
Vasquez, Julio; "Laboratory Evaluation of a Relative Permeability Modifier for Profile Modification in Injection Wells"; Copyright 2009, SPE 120669.
Terry, Ronald E.; "Enhanced Oil Recover"; Encyclopedia of Physical Science and Technology 3rd Edition, vol. 18. Robert A. Meyers Ed., Academic Press (2001) pp. 503-518.
Fehler, Mike et al; "Fractured Reservoirs"; http://erl.mit.edu/fractured-reservoirs.php; 2013; 2 pages.
Borling, Daniel; "Pushing Out the Oil with Conformance Control"; Oilfield Review; Apr. 1994; pp. 44-58.
Effect of Pore-Throat Size on RPMs; Relative Permeability Modifiers for Improved Oil Recovery: A Literature Review (Paper / Article); http://www.halliburton.com/public/pe/contents/Papers_and_Articles/web/A_through_P/H02378-09.asp; 2 Pages; 2014.
Waterflooding; http://petrowiki.org/Waterflooding; 3 Pages; retrieved Feb. 21, 2014.
The International Search Report and Written Opinion mailed Nov. 26, 2014; in PCT patent application No. PCT/US2014/017837.

AMIDO-FUNCTIONALIZED GEMINI SURFACTANT FOR FLUID CONTROL IN SUBTERRANEAN FORMATIONS

CROSS-REFERENCE TO RELATED APPLICATIONS

This application is a national stage entry of PCT/US2014/017837 filed Feb. 21, 2014, said application is expressly incorporated herein in its entirety.

FIELD

The present disclosure relates generally to fluid control in subterranean wellbores. In particular, the present disclosure relates to introducing an amido-functionalized Gemini surfactant into a subterranean formation containing a hydrocarbon reservoir, where the surfactant has the effect of resisting the flow of water without hindering the flow of hydrocarbons.

BACKGROUND

Oil and gas operations involve accessing underground hydrocarbon reservoirs contained within subterranean formations. Such hydrocarbon reservoirs are also accompanied by large amounts of water which can negatively affect oil production. As hydrocarbons are drawn from the well over time, water displaces the hydrocarbons in the formation and therefore becomes an increasing fraction during production. Once the production of water becomes too high, the cost of obtaining the decreasing amounts of hydrocarbon becomes too great and the reservoir is then abandoned. Accordingly, hydrocarbon production and the life of the reservoir are greatly determined by the effectiveness of water management.

The initial production of hydrocarbons from a reservoir is driven largely by the pressure naturally present in the subterranean formation. Accordingly, due to natural fractures or hydraulic fracturing in the formation, hydrocarbons are drawn to the well under the natural pressures in the system. However, once the natural pressures are relieved, other measures must be taken to maintain production. Accordingly a secondary means for driving the production of hydrocarbons in the well includes water flooding operations. Water flooding involves injecting brine, saltwater or some other fluid into the formation to increase pressure and drive the hydrocarbons toward a well for production.

The measure of the effectiveness of water flooding operations is referred to as conformance. In particular, conformance relates to the ability of the flood front of the injected water to uniformly sweep hydrocarbons from all portions of the reservoir as the water propagates through the system. With imperfect conformance, a certain amount of the hydrocarbons will be left within various pockets of the reservoir. Conformance improvement refers to the ability to access such pockets and drive hydrocarbons from hard to reach or less permeable portions of the formation.

Current technologies applied in the oil industry for improved conformance include mechanical solutions such as plugs, packers, and the like. Chemical solutions can also be employed including monomer systems, polymer gels, and relative permeability modifiers (RPM). Such technologies involve placement of materials to block or restrict the flow of water from water zones into productive hydrocarbon zones. Accordingly, additional technologies are required to further improve conformance.

BRIEF DESCRIPTION OF THE DRAWINGS

Implementations of the present technology will now be described, by way of example only, with reference to the attached figures, wherein.

DETAILED DESCRIPTION

Figure 1:
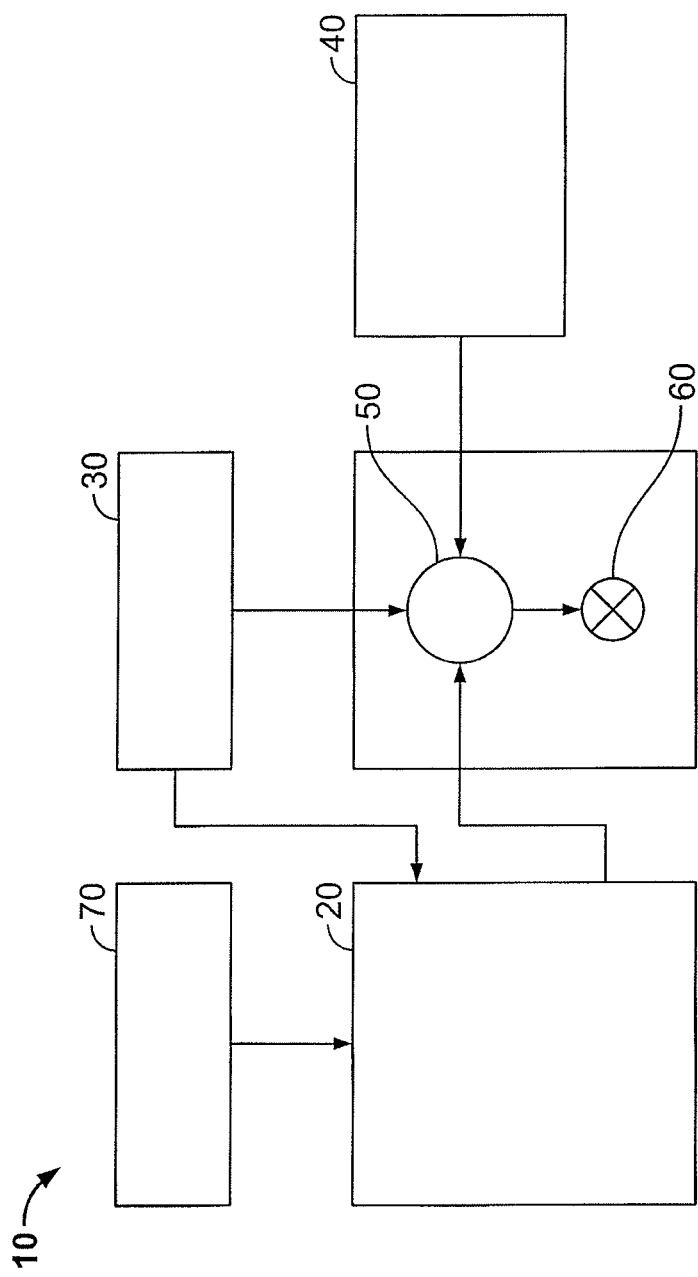
FIG. 1 is a diagram illustrating an example of a fracturing system that may be used in accordance with certain embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A surfactant is disclosed for controlling fluid flow in a subterranean formation containing water and hydrocarbons. Such fluid control, as disclosed herein, involves introducing a Gemini surfactant into the wellbore, wherein the Gemini surfactant comprises a head group having two cationic groups linked by an alkyl spacer. Further, the compound has an amide extending from each of the cationic groups with each amide having a hydrophobic tail extending therefrom.

The Gemini surfactant disclosed herein for fluid control in a subterranean formation has the formula I:

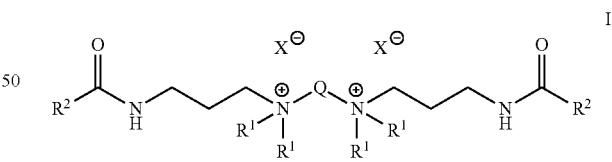

wherein
Q is $C_3$-$C_6$-alkyl;
R1 each independently is $C_1$-$C_5$ alkyl;
R2 each independently is $C_7$-$C_{17}$ alkyl;
X is a halogen selected from F, Cl, Br, or I.

In this depiction, the quaternized amines separated by the alkyl spacer Q form the head group of the molecule. The quaternized amines are by definition cationic and may be quaternized by any method and can employ any counter ion capable of quaternizing the amine. However, in the illustrated example, the amines are quaternized by a halogen, including F, Cl, Br, or I. In some examples the counter ion is bromide.

Although quaternized amines are shown in the illustrated example of formula I, in other examples, other cationic groups may be employed, including quaternized phosphines rather than amines. Further, in some examples, the quaternization can occur prior to introduction into the well, during or subsequent. In any case, the cationic groups should be formed in the surfactant so as to provide hydrophilic polar groups for attachment to the formation rock, as will be further discussed below.

The alkyl bridge, shown as Q in formula I, can be unsubstituted or substituted with further alkyl groups. The alkyl bridge in the illustrated embodiment is not further functionalized with any carbon or further heteroatoms such as oxygen other than the quaternary amine cationic groups. Further, the alkyl bridge can be propyl, butyl, pentyl or hexyl. While longer or shorter chains can be employed, the stability of the surfactant can be negatively affected and also lead to difficulties in synthesis.

The Gemini surfactant disclosed in formula I has an arm extending from each cationic group made up of an N-substituted amide. The N-substituted portion forms an alkyl bridge between the amide and amine nitrogen atoms in each surfactant arm. Further, the amide has an alkyl chain which forms a hydrophobic tail. As shown in formula I, the akyl bridge is propyl and the hydrophobic tail is a $C_7$-$C_{17}$ alkyl.

as discussed above with respect to formula I. As shown, the N-substituted alkyl $R^3$ forms a bridge to the cation in each tail of the surfactant, and additionally, the alkyl moiety $R^2$ forms a hydrophobic tail.

Accordingly, at the locus of the carbonyl and nitrogen of the amide, the surfactant is both polar and hydrophilic. Due to the short propyl bridge between the nitrogen atoms, the amine and amide groups are in close proximity near the head portion of the molecule. The amide also contains a long $C_7$-$C_{17}$ alkyl hydrocarbon tail which gives the surfactant hydrophobic properties. Accordingly, the Gemini surfactant disclosed herein has two hydrophilic moieties near the head while also having two hydrophobic moieties at the tail portions. In particular, when including both the amine and amide functionalities, the surfactant disclosed herein can be considered to have four hydrophilic moieties near its head group. The juxtaposition of the hydrocarbon toward the tail and the polar groups near the head of the molecule give the surfactant unique properties advantageous for control of fluids in a subterranean formation.

The Gemini surfactant disclosed herein can be synthesized according to conventional methods known in the art. For example, disclosed herein is a method for synthesizing an amido-amine Gemini surfactant according to formula I. One synthesis method is shown as follows:

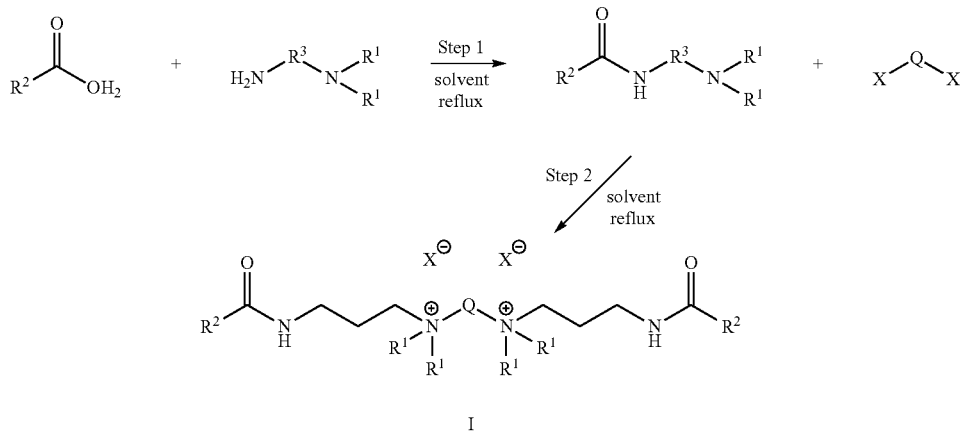

I

Accordingly, the amide is an N-propyl $C_7$-$C_{17}$-alkanamide, where the N-propyl portion forms the alkyl bridge extending to the quaternized amine. In other embodiments, the alkyl bridge can be employed smaller or larger alkyl chains of 2, or 4-6 carbons, however stability of the compound is degraded and synthesis difficulty is increased due to steric hindrance. Moreover, the hydrophobic alkyl tail can be larger or smaller than $C_7$-$C_{17}$ alkyl, however, it should be sufficiently long to have hydrophobic properties.

The amide of the Gemini surfactant disclosed herein can have the following formula II:

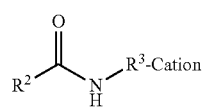

II wherein $R^2$ has the meaning previously described, $R^3$ is propyl, and the cation is a quaternary amine or other cation Above, $R^1$, $R^2$, $R^3$, and Q have the meanings previously assigned.

In step 1 of the synthesis, a carboxylic acid is reacted with a diamine, such as N,N-dimethylaminopropylamine. The carboxylic acid preferably has an alkyl chain equal in length to the desired hydrophic tail in the final surfactant. The solvent employed can be any inert hydrocarbon solvent, such as aromatic hydrocarbons, benzene, toluene, xylene, as well as nitriles including acetonitrile, or mixtures of such solvents. The reaction can be conducted in air or in an inert atmosphere such as nitrogen and can take, for example, from about 14 to 16 hours.

Step 2 is a halogenation reaction and can employ any suitable halogenating agent, for example dihaloalkane. For instance, when bromide is the desired counterion, a dibromoalkane can be used such as 1,3-dibromopropane, 1,4-dibromobutane, 1,5-dibromopentane, 1,6-dibromohexane. The alkyl unit in the dihaloalkane can be equivalent to the alkyl desired size for Q in formula I. Any suitable inert solvent can be utilized, for example, solvents including protic or aprotic polar solvents, such as alcohols, ketones, esters, acetone, ethanol, acetonitrile, isopropanol, or chloroform. The reaction can be conducted for about 55 to 65 hours.

In some embodiments, the final product formula I can be provided in water or any water miscible solvent including lower ketones, lower esters, such as methyl acetate, ethyl acetate, or lower alcohols such as methanol, ethanol and the like.

Exemplary surfactants include, but are not limited to the following amido-amine Gemini surfactants of formula I:

| Example | $R^2$ | Q | $R^1$ | X |
|---|---|---|---|---|
| 1 | $C_7H_{15}$ | $C_3H_6$ | $CH_3$ | Br |
| 2 | $C_8H_{17}$ | $C_3H_6$ | $CH_3$ | Br |
| 3 | $C_9H_{19}$ | $C_3H_6$ | $CH_3$ | Br |
| 4 | $C_{10}H_{21}$ | $C_3H_6$ | $CH_3$ | Br |
| 5 | $C_{11}H_{23}$ | $C_3H_6$ | $CH_3$ | Br |
| 6 | $C_{12}H_{25}$ | $C_3H_6$ | $CH_3$ | Br |
| 7 | $C_{13}H_{27}$ | $C_3H_6$ | $CH_3$ | Br |
| 8 | $C_{14}H_{29}$ | $C_3H_6$ | $CH_3$ | Br |
| 9 | $C_{15}H_{31}$ | $C_3H_6$ | $CH_3$ | Br |
| 10 | $C_{16}H_{33}$ | $C_3H_6$ | $CH_3$ | Br |
| 11 | $C_{17}H_{35}$ | $C_3H_6$ | $CH_3$ | Br |
| 12 | $C_7H_{15}$ | $C_6H_{12}$ | $CH_3$ | Br |
| 13 | $C_8H_{17}$ | $C_6H_{12}$ | $CH_3$ | Br |
| 14 | $C_9H_{19}$ | $C_6H_{12}$ | $CH_3$ | Br |
| 15 | $C_{10}H_{21}$ | $C_6H_{12}$ | $CH_3$ | Br |
| 16 | $C_{11}H_{23}$ | $C_6H_{12}$ | $CH_3$ | Br |
| 17 | $C_{12}H_{25}$ | $C_6H_{12}$ | $CH_3$ | Br |
| 18 | $C_{13}H_{27}$ | $C_6H_{12}$ | $CH_3$ | Br |
| 19 | $C_{14}H_{29}$ | $C_6H_{12}$ | $CH_3$ | Br |
| 20 | $C_{15}H_{31}$ | $C_6H_{12}$ | $CH_3$ | Br |
| 21 | $C_{16}H_{33}$ | $C_6H_{12}$ | $CH_3$ | Br |
| 22 | $C_{17}H_{35}$ | $C_6H_{12}$ | $CH_3$ | Br |

Accordingly, the amido-amine Gemini surfactant of formula I can include the following:

Octanoic acid [3-({3-octanoylamino-propyl)-dimethyl-amino]-propyl-dimethyl-amino)-propyl}-amide dihydrobromide;

Decanoic acid [3-({3-[decanoylamino-propyl)-dimethyl-amino]-propyl}-dimethyl-amino)-propyl]-amide dihydrobromide;

DoDecanoic acid [3-({3-[dodecanoylamino-propyl)-dimethyl-amino]-propyl}-dimethyl-amino)-propyl]-amide dihydrobromide;

Tetradecanoic acid [3-({3-[tetradecanoylamino-propyl)-dimethyl-amino]-propyl}-dimethyl-amino)-propyl]-amide dihydrobromide;

hexadecanoic acid [3-({3-[hexadecanoylamino-propyl)-dimethyl-amino]-propyl}-dimethyl-amino)-propyl]-amide dihydrobromide;

Octadecanoic acid [3-({3-[Octadecanoylamino-propyl)-dimethyl-amino]-propyl}-dimethyl-amino)-propyl]-amide dihydrobromide;

Octanoic acid [3-({3-octanoylamino-propyl)-dimethyl-amino]-hexyl}-dimethyl-amino)-propyl]-amide dihydrobromide;

Decanoic acid [3-({3-[decanoylamino-propyl)-dimethyl-amino]-hexyl}-dimethyl-amino)-propyl]-amide dihydrobromide;

DoDecanoic acid [3-({3-[dodecanoylamino-propyl)-dimethyl-amino]-hexyl}-dimethyl-amino)-propyl]-amide dihydrobromide;

Tetradecanoic acid [3-({3-[tetradecanoylamino-propyl)-dimethyl-amino]-hexyl}-dimethyl-amino)-hexyl]-amide dihydrobromide;

hexadecanoic acid [3-({3-[hexadecanoylamino-propyl)-dimethyl-amino]-hexyl}-dimethyl-amino)-hexyl]-amide dihydrobromide;

Octadecanoic acid [3-({3-[Octadecanoylamino-propyl)-dimethyl-amino]-hexyl}-dimethyl-amino)-hexyl]-amide dihydrobromide;

The amido functionalized Gemini surfactant that is disclosed, as a result of its structure, has unique properties for fluid management in a subterranean formation. In particular, the amido functionalized Gemini surfactant can be introduced into the formation to resist the flow of water while at the same time not restricting the flow of hydrocarbons. Further, in some examples, the surfactant can serve to enhance the flow of hydrocarbons.

The amido functionalized Gemini surfactant can be applied before, during or after fracking (i.e. fracturing) operations, for example hydrocarbon recovery processes such as water flooding. Fracking as well as hydrocarbon recovery processes can be implemented with a number of components or pieces of equipment.

In particular, the exemplary methods and compositions disclosed herein may directly or indirectly be effected by, or affect one or more components or pieces of equipment associated with the preparation, delivery, recapture, recycling, reuse, and/or disposal of the disclosed compositions. For example, and with reference to FIG. 1, the described methods and compositions may directly or indirectly utilize, and/or affect one or more components or pieces of equipment associated with an exemplary fracturing system 10, according to one or more disclosed embodiments. In certain instances, the system 10 includes a fracturing fluid producing apparatus 20, a fluid source 30, a proppant source 40, and a pump and blender system 50 (blending and pumping equipment) and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, we gases, Gemini surfactants disclosed herein and/or other fluids. In some embodiments, only a fluid for post fracturing hydrocarbon recovery operations can be injected.

The proppant source 40 can include a proppant for combination with the fracturing fluid. The system may also include additive source 70 that provides one or more additives (e.g., gelling agents, weighting agents, Gemini surfactants disclosed herein and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid or other fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and can facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times. Moreover, the pump can be used to inject fluids in secondary operations, including for example Gemini surfactants, into the well.

Figure 2:
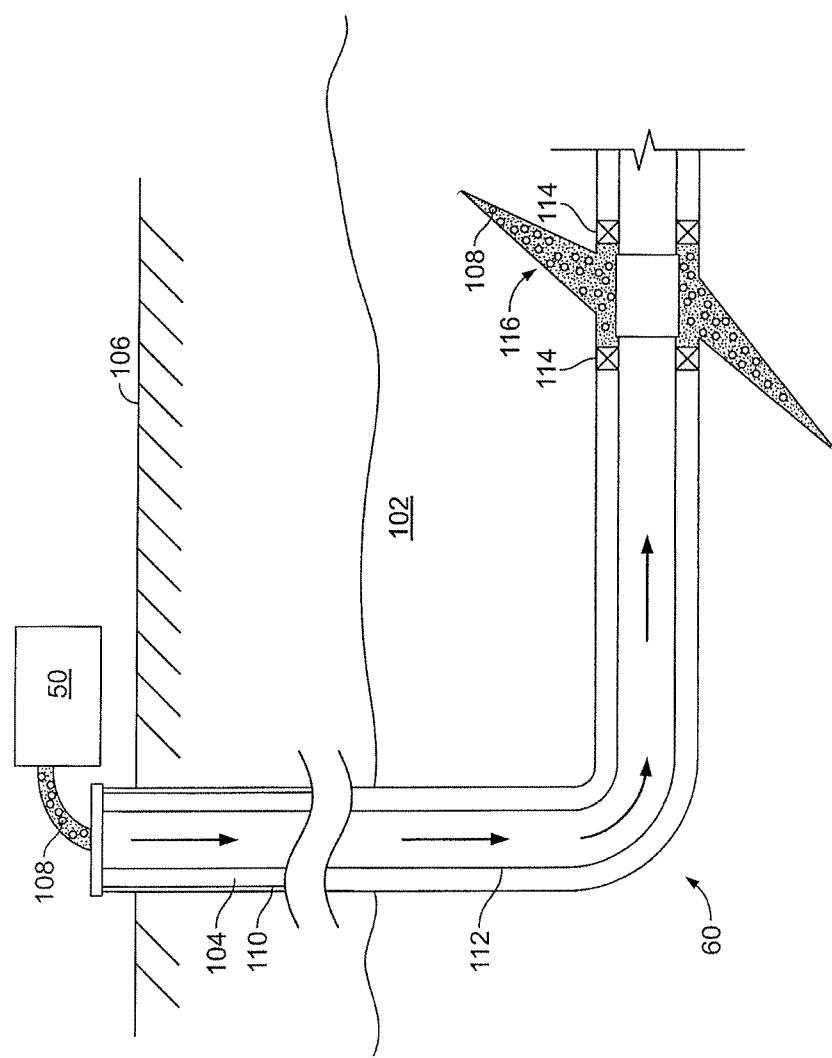
FIG. 2 is a diagram illustrating an example of a subterranean formation in which a fracturing operation can be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

As previously discussed, many hydrocarbon reservoirs are also accompanied by the presence of water within the formation which can complicate hydrocarbon production. The production of water increases costs, reduces productivity of the well, and can lead to abandonment when the amount of produced water becomes too high. While hydrocarbons are initially drawn from the reservoir based on the natural pressure of the system, once the pressure decreases or the fraction of produced water becomes too high, other operations can be conducted to increase pressure and increase the hydrocarbon extraction. As previously described, one of the primary techniques employed as a secondary recovery process is water flooding.

Water flooding involves the injection of brine, saltwater, seawater, aqueous fluid or some other fluid into the formation to drive, or sweep, hydrocarbon to a production well which is then drawn to the surface. The pumping system shown in FIG. 1 can be used to inject the fluid during water flooding operations. Notably, the formation contains permeable rock as well as fractures through which the water and hydrocarbon flow. Different zones within the formation may contain varying amounts of hydrocarbon and water, with some zones being made up substantially of water and others of hydrocarbon. Furthermore, the formation rock varies in its permeability, with some zones being of higher permeability and other zones having low permeability. It is desirable to flush or sweep the hydrocarbon zones while minimizing the flow of water from such water zones. Injected water from water flooding can initially have a tendency to enter the zones of least resistance; i.e., those of high permeability, and in turn leave low permeability zones untouched with hydrocarbon remaining in those formations. This reduces conformance, decreases hydrocarbon production from the reservoir and results in increased costs.

The amido functionalized Gemini surfactant disclosed herein can be employed in any number of ways to block or resist water from flowing into zones where it is not desired. For example, the disclosed surfactant can be injected into water-containing zones to resist or block water from flowing to hydrocarbon zones. In other examples, the surfactant can be delivered with the fluid during water flooding to increase sweep efficiency of the flood and improve conformance. Furthermore, the surfactant can simply be injected without having to locate the sources of water production. For example, during such operations it can naturally adsorb onto the formation in permeable zones and restrict the flow of water.

The surfactant can also be employed during any phase of hydrocarbon production from a reservoir, for example after drilling a wellbore, during initial hydrocarbon production, or before, during or after fracking processes, or during primary, secondary, and/or tertiary recovery processes and enhanced oil recovery (EOR) operations. When provided during fracking operations, the surfactant can also be provided with a proppant conventionally used in fracking, such as sand, ceramic material, aluminum oxide, or other solid material or grain.

When introduced into the formation, the described surfactants can act as relative permeability modifiers (RPM's).

As RPM's, the surfactant reduces the effective permeability and flow of water without significantly affecting the flow of hydrocarbons, and in some cases enhance the flow of hydrocarbons.

The unique structure of the disclosed surfactant provides advantageous properties useful as an RPM. The inclusion of both hydrophilic and hydrophobic groups in the molecule permits multiple advantageous functions. In particular, the polar, hydrophilic groups near the head group enable dissolution of the surfactant in the delivery fluid as well as adsorption onto the formation rock. The hydrophobic tails made up of a hydrocarbon chain serves to resist the flow of water and can enhance the flow of hydrocarbons.

Due to the polar groups in and near the head group, the surfactant is capable of dissolving in an aqueous delivery fluid. Due to such dissolution in the fluid, it is more easily handled, mixed and introduced into the wellbore, formation or desired zones. Accordingly, the fluid for delivery can be the same as that used for water flooding, and can include any aqueous fluid or water miscible fluid. In these examples, the delivery fluid containing the surfactant can be brine, saltwater, seawater, saline, or any other aqueous solution or dispersion.

Further, once introduced into the wellbore and formation, the surfactant has the tendency to adsorb onto the formation rock. The cationic groups in the head group; e.g., quaternary amines, as well as the amido groups assist in adsorption onto the rock face. The adsorption of the Gemini surfactant molecules may be due to electrostatic adsorption or chemisorption onto the formation surface. The formation can be made up of a variety of different minerals or rock, for example, sandstone, quartz, feldspar, limestone, dolomite, calcite, carbonates, calcium carbonate, silicates, mixtures thereof or other materials typically found in subterranean formations.

When injected, the Gemini surfactant containing fluid sweeps through the pores and fractures of the formation rock. As it propagates through the system, the surfactant adsorbs onto the pore walls by means of its polar groups. Upon adsorption, the hydrocarbon tails extend, and due to their hydrophobicity, restrain the flow of water. Moreover, because such hydrophobic tails are made up of long hydrocarbon chains, they also act to assist or enhance the flow of hydrocarbons through the pores of the formation. Accordingly, the dual nature of the molecule results in its dual capability to control the water and the hydrocarbon fluids within the formation. The basis of such differences is a result of the differences between water and hydrocarbons. Water being a polar compound, and hydrocarbons (e.g. oil) being generally made up of non-polar carbon chains will acclimate or respond to the different portions of the molecule differently. In particular, the hydrophobic tail will enhance flow or miscibility with hydrocarbons while resisting water, whereas the polar, hydrophilic portions will interact with the formation rock as well as the aqueous based delivery fluid.

Within the formation system, there are two acting surface forces which affect the flow of hydrocarbons, namely (1) the surface tension between the formation rock and the water and/or hydrocarbon, which can be termed wettability, as well as (2) the surface tension between water and hydrocarbons. The wettability of the rock formation can assist or resist the flow of hydrocarbon. For example, when the formation rock is water-wet, the formation rock tends to resist the flow of hydrocarbon. Additionally, the water and hydrocarbon phases are immiscible and therefore, in the absence of a surfactant, the interfacial surface tension between the water and hydrocarbon phases is high, consequently also resisting the flow of hydrocarbon.

In the presence of the Gemini surfactant however, these forces are reduced or reversed. In particular, the surfactant reduces the interfacial surface tension between the water and hydrocarbon making the two phases more miscible. Because the interfacial forces are reduced, the resistance to flow is also reduced thereby permitting or assisting the flow of hydrocarbons. Moreover, due to the adsorption of the surfactant onto formation pores, the wettability of the formation of the rock is shifted. Due to the surfactant's hydrophobic tail, the rock formation becomes more "oil-wet" rather than water wet. As a result, rather than having a resistant rock surface, the presence of the surfactant on the surfaces of the pores encourages or enhances the flow of the hydrocarbon through the pores. Consequently, the surfactant can create a capillary action within the pores of the formation such that hydrocarbons are drawn through the formation pores. Hydrocarbon recovery and conformance operations are thereby improved.

The Gemini surfactants disclosed herein additionally have a low critical micelle concentration. Critical micelle concentration (CMC) is defined as the concentration above which micelles form in a given medium. In the present case, in water, the critical micelle concentration is less than 30 mmol/l, alternatively less than 20 mmol/l, alternatively less than 15 mmol/l, alternatively less than 12.5 mmol/l, alternatively less than 10 mmol/l, alternatively less than 5 mmol/l, alternatively less than 1 mmol/l, alternatively less than 0.1 mmol/l. In some examples, the range is between 0.008-20 mmol/l, or alternatively 0.008-12.5 mmol/l. Due to the lower CMC, a lower quantity of surfactant is needed to induce water resistance and/or shutoff properties. Notably, the alkyl bridge and/or the length of the hydrophobic tail can affect the CMC value. For example, as the length of the bridge or the tail is increased, the CMC correspondingly increases.

Additionally, the surfactant disclosed herein maintains its properties even in harsh conditions of a subterranean formation. For example, the Gemini surfactant herein needs no pH adjustment. Furthermore the surfactant is effective even at high temperatures found in subterranean formations.

The embodiments shown and described above are only examples. Some details can be found in the art, and therefore many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method for controlling fluid flow in a subterranean formation containing water and hydrocarbons, the method comprising:
   dissolving a Gemini surfactant in an aqueous delivery fluid without pH adjustment, the Gemini surfactant having the formula I

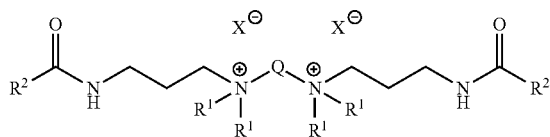

wherein
Q is an unsubstituted $C_3$-$C_6$-alkyl;
$R^1$ each independently is $C_1$-$C_5$ alkyl;
$R^2$ each independently is $C_7$-$C_{17}$ alkyl; and
X is a halogen selected from F, Cl, Br, or I;
pumping the aqueous delivery fluid having the Gemini surfactant into the subterranean formation, the subterranean formation containing pores;
propagating the Gemini surfactant containing aqueous delivery fluid through the pores of the formation;
adsorbing the Gemini surfactant onto a surface within the pores; and
enhancing the flow of hydrocarbon into the production well and inhibiting the flow of the water by the presence of the Gemini surfactant in the pores of the formation, wherein the Gemini surfactant acts as a relative permeability modifier.

2. The method of claim 1, wherein X is Br.
3. The method of claim 1, wherein the Gemini surfactant is provided to the subterranean formation in a fluid using pump equipment.
4. The method of claim 3, wherein the fluid comprises at least one of brine, saltwater, seawater and mixtures thereof.
5. The method of claim 3, wherein the Gemini surfactant is mixed with a fracturing fluid using blending equipment.
6. The method of claim 3, wherein the fluid is provided after a fracking process as part of a water flooding process.
7. The method of claim 1, wherein the subterranean formation comprises at least one of sandstones, limestones, dolomite, calcite, carbonates, calcium carbonate, or silicates, or mixtures thereof.
8. The method of claim 1, wherein the critical micelle concentration of the Gemini surfactant in the fluid is less than 12.5 mmol/l.
9. The method of claim 1, wherein $R^2$ is $C_7$-$C_{12}$ alkyl.
10. The method of claim 1, wherein $R^2$ is $C_7$-$C_{10}$ alkyl.
11. The method of claim 1, wherein the Gemini surfactant adsorbed onto the surface of the pores creates a capillary action within the pores of the formation thereby drawing hydrocarbons through the pores of the formation.

12. The method of claim 1, wherein Q is a $C_6$-alkyl.
13. The method of claim 1, wherein the formation comprises sandstone.
14. A process for controlling the flow of water and hydrocarbons in a subterranean formation comprising:
dissolving a Gemini surfactant in an aqueous delivery fluid without pH adjustment, wherein the Gemini surfactant has the formula I:

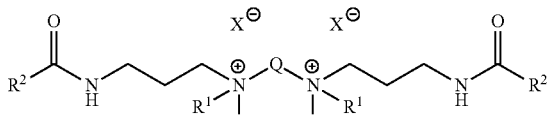

wherein
Q is unsubstituted $C_3$-$C_6$-alkyl;
$R^1$ each independently is $C_1$-$C_5$ alkyl;
$R^2$ each independently is $C_7$-$C_{17}$ alkyl; and
X is a halogen selected from F, Cl, Br, or I;
pumping the aqueous delivery fluid having the Gemini surfactant into the subterranean formation, the subterranean formation containing pores;
propagating the Gemini surfactant containing aqueous delivery fluid through the pores of the formation;
adsorbing the Gemini surfactant onto a surface within the pores;
injecting a second aqueous fluid into a zone of the formation for sweeping hydrocarbon into a production well; and
enhancing the flow of hydrocarbon into the production well and inhibiting the flow of water by the presence of the Gemini surfactant in the pores of the formation.
15. The process of claim 14 wherein the fluid is prepared utilizing blending equipment and is provided to the subterranean formation utilizing pumping equipment.
16. The method of claim 14, wherein the Gemini surfactant is introduced downhole in a water flooding process.
17. The process of claim 14, wherein $R^2$ is $C_7$-$C_{12}$ alkyl.
18. The process of claim 14, wherein $R^2$ is $C_7$-$C_{10}$ alkyl.
19. The process of claim 14, wherein the Gemini surfactant is providing a fluid to a subterranean formation in a water flooding process.

* * * * *